United States Patent
Novitsky

[11] Patent Number: 6,153,135
[45] Date of Patent: Nov. 28, 2000

[54] METHOD FOR PRODUCING VACUUM INSULATING AND CONSTRUCTION MATERIAL

[76] Inventor: Charles Novitsky, 7606 7th Ave., Brooklyn, N.Y. 11209

[21] Appl. No.: 08/278,154

[22] Filed: Jul. 21, 1994

Related U.S. Application Data

[63] Continuation-in-part of application No. 08/002,261, Jan. 8, 1993, abandoned.

[51] Int. Cl.$^7$ .............................. B05D 3/00; B29C 44/06
[52] U.S. Cl. ........................ 264/51; 264/102; 264/129; 264/279.1; 427/294
[58] Field of Search .................................. 264/101, 102, 264/271.1, 279.1, 51, 129; 428/69; 427/294, 238

[56] References Cited

U.S. PATENT DOCUMENTS

| | | | |
|---|---|---|---|
| 3,769,770 | 11/1973 | Deschamps et al. | 52/788.1 |
| 3,896,060 | 7/1975 | Plunguian et al. | 264/50 |
| 4,024,309 | 5/1977 | Pender | 428/312.6 |
| 4,079,162 | 3/1978 | Metzger | 428/312 |
| 4,172,915 | 10/1979 | Sheptak et al. | 428/69 |
| 4,241,806 | 12/1980 | Metzger | 428/311.7 |
| 4,279,632 | 7/1981 | Frosch et al. | 264/24 |
| 4,444,821 | 4/1984 | Young et al. | 428/69 |
| 4,594,279 | 6/1986 | Yoneno et al. | 428/69 |
| 4,636,416 | 1/1987 | Kratel et al. | 428/69 |
| 4,668,555 | 5/1987 | Uekado et al. | 428/69 |
| 4,681,788 | 7/1987 | Barito et al. | 428/69 |
| 4,727,854 | 3/1988 | Johnson | 126/92 B |
| 4,938,667 | 7/1990 | della Porta | 417/48 |
| 4,955,135 | 9/1990 | Pinkhasov | 264/41 |
| 5,018,328 | 5/1991 | Cur et al. | 50/406 |
| 5,120,481 | 6/1992 | Brackman et al. | 264/51 |
| 5,171,346 | 12/1992 | Hallett | 264/46.9 |
| 5,284,606 | 2/1994 | Brotz | 264/29.1 |
| 5,308,572 | 5/1994 | Hackman | 264/279.1 |
| 5,322,652 | 6/1994 | Brotz | 264/29.1 |

FOREIGN PATENT DOCUMENTS 49-24988  6/1974  Japan ....................... 428/69

*Primary Examiner*—Allan R. Kuhns
*Attorney, Agent, or Firm*—Roper & Quigg

[57] ABSTRACT

Vacuum insulating and construction materials are provided by producing bubble containing, solid materials such as individual bubbles, multiple bubbles, foamed material, and the like in an environment of less than atmospheric pressure and enclosing the bubbles produced in an air-tight encapsulating material while still in the environment of less than atmospheric pressure or encapsulating natural material containing chambers having gas-porous enclosing walls. On being moved into an environment of atmospheric pressure the bubbles retain their vacuum quality.

8 Claims, 3 Drawing Sheets

METHOD FOR PRODUCING VACUUM INSULATING AND CONSTRUCTION MATERIAL

This application is a continuation-in-part of application Ser. No. 08/002,261, filed Jan. 8, 1993, now abandoned.

BACKGROUND OF THE INVENTION

1. Field of the Invention

This invention relates to insulation and construction materials. In one of its aspects it relates to material used for thermal and acoustic insulation. In another of its aspects it relates to vacuum insulation materials i.e. insulating materials containing enclosed spaces in which the pressure is less than atmospheric pressure. In another of its aspects this invention relates to construction materials containing enclosed spaces in which the pressure is less than atmospheric pressure. In yet another of its aspects this invention relates to ultralight construction materials. In still another of its aspects this invention relates to the production of vacuum insulation materials. In still another of its aspects this invention relates to the production of construction materials containing enclosed spaces in which the pressure is less than atmospheric pressure. In yet another aspect this invention relates both (1) to providing hollow fibers having enclosed spaces in which the pressure is less than atmospheric pressure and (2) to combining these fibers into mat or cloth, as by entangling the fibers or weaving the fibers.

2. Description of the Prior Art

Vacuum insulation techniques have been known for use in various applications for both thermal and acoustic insulation material. Such material makes use of the advantage of having a reduced number of molecules in a vacuum chamber encapsulated within the material so that the transfer of heat or sound is reduced as compared to material having chambers encapsulating gases at atmospheric pressure or higher pressures. Obviously, the greater the reduction of pressure within a vacuum chamber the more effective will be the barrier to the transfer of heat or sound energy through the chamber and increasing the ratio of open space to supporting structure also reduces the transfer of heat or sound through an insulating material.

While several approaches have been tried in the production of vacuum insulation the most common schemes have relied on producing air-tight enclosing structures that are supported from within by loosely packed filler which upon the evacuation of gas from the structure prevents the structure from collapsing on itself, but still provides interstices between the units of filler from which gas can be withdrawn. After the evacuation of gas, the structure is sealed to maintain the vacuum.

Other production approaches enclose within a single air-tight, outer structure a multiplicity of either elongated, relatively flat, air-tight, bag structures or elongated, sausage-shaped, air-tight structures of relatively small diameter, either of which are supported on the inside by microporous insulation material. Gas is withdrawn from the individual, filled structures and each is individually sealed before the multiplicity of structures is enclosed within an air-tight outer structure and the outer structure is sealed.

Although vacuum insulation produced by the processes discussed above is effective, the evacuation and sealing of the filler supported structures can be tedious and costly. The present invention eliminates the need to evacuate gases from filler supported structures and provides material that can retain its vacuum characteristic after being cut or machined.

Also known in the prior art is the method set out in U.S. Pat. No. 4,024,309, in which a foamed glass panel is formed under vacuum conditions and passed through a metal cladding operation before being discharged into atmospheric conditions. A foamed glass having contained chambers of less than atmospheric pressure is thereby produced with the metal cladding providing structural strength to aid in protecting the air-tight seals of the more fragile foamed glass structures. The metal cladding is applied for structural strength and, since the cladding is not described as encapsulating the foam and is pierced after its application, is not incorporated to provide an air-tight seal around the foamed glass.

The technique, described herein, that is used for producing vacuum insulation can be used, by the process of this invention, to produce construction materials i.e. materials, that because of the innate strength of the materials used, can be formed into shapes containing bubbles in which the contained gas is at a pressure less than atmospheric. Such construction materials are useful in constructing products in which the combination of lightness and strength of material is an asset. Among such products are automobiles, airplanes, spacecraft and boats.

Techniques described herein can also be used to produce insulating layers for fabric useful in clothing, bed covers, and camping gear. With the proper choice of construction material the performance and look of down filled fabric can be duplicated without the drawback of potential, feather allergy.

It is also easily understood that bubbles having an internal pressure of less than atmospheric pressure can be incorporated into construction material at sufficiently high ratio to the total amount of solid material in the structure and encapsulating material that the resulting product would be buoyant in a fluid, liquid or gas, of greater density.

Note that for the purposes of this invention the term "bubble" includes any space surrounded by an enclosing material. It is used herein synonymously with void, chamber, pocket, interstice, area of space and other such terms. Also note that the terminology hereinafter describing the material of the invention as having at least one enclosed chamber therein refers to material that typically has numerous chambers or is filled with a multitude of chambers.

It is, therefore, an object of the present invention to provide an improved process for the manufacture of vacuum insulating materials.

It is another object of this invention to provide vacuum insulating materials made by the process of this invention.

It is still another object of this invention to provide a process for the manufacture of vacuum insulating materials eliminating the need to evacuate gases from the insulating material structure.

It is still another object of this invention to provide vacuum insulating materials of improved structure.

It is another object of this invention to provide construction materials and a method for producing construction materials having encapsulated therein bubbles or pockets within which the pressure is less than atmospheric pressure.

It is yet another object of this invention to provide a fibrous, insulating material that can be incorporated into fabric.

These and other objects and advantages of the present invention will become evident to those skilled in the art by reference to the following description and drawings and the appended claims.

SUMMARY OF THE INVENTION

Figure 1:
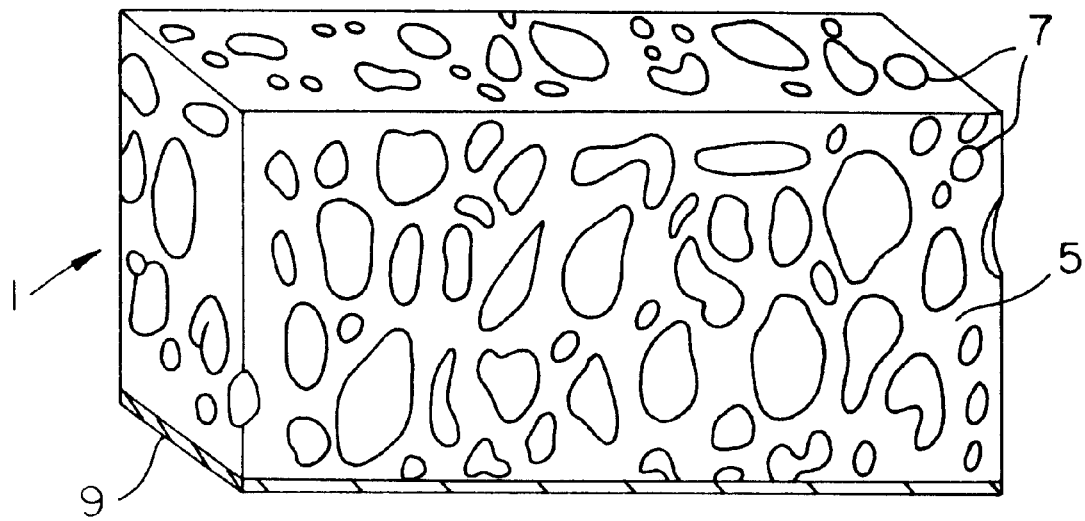
FIG. 1 is a cut sample of a honeycomb textured insulating material in which bubbles of less than atmospheric pressure are encapsulated in a matrix of air-tight material with a stratum of reflective material laminated thereto.

There is provided herein a method for preparing an article of manufacture said article comprising at least one chamber enclosed by a solid, air-tight, encapsulating material, (a) the pressure inside the at least one chamber being less than atmospheric pressure, and (b) the encapsulating material of sufficient strength to maintain the integrity and the vacuum characteristic of the at least one chamber the method comprising: in an environment under less than atmospheric pressure (1) treating a material to provide a treated solid material having at least one enclosed chamber therein wherein the at least one enclosed chamber is under less than atmospheric pressure and (2) encapsulating the at least one enclosed chamber in a solid, air-tight, encapsulating material of sufficient strength to maintain the integrity and the vacuum characteristic of the at least one enclosed chamber.

In a preferred mode of this invention an article of manufacture is prepared by treating a liquid material in an environment under less than atmospheric pressure to provide a treated solid material having at least one enclosed chamber therein under less than atmospheric pressure wherein the treated material on solidifying is air-tight thereby maintaining the vacuum characteristic of the at least one chamber and of sufficient strength to maintain the integrity of the at least one chamber when formed into an article of manufacture.

In variation of the technique described immediately above the material is treated to produce bubbles under atmospheric pressure or under a slight vacuum and then the material containing at least one enclosed chamber therein is transferred into an environment of greater vacuum so that the enclosed chambers are allowed to expand thereby decreasing the pressure within the enclosed chambers before the material sets or hardens to provide air-tight enclosure of the chambers.

Another aspect of the invention involves (1) treating a molten material to provide at least one chamber therein, (2) while still in the molten state introducing the material with at least one chamber therein into a mold, (3) allowing the material in the mold to cool below the melting temperature thereby providing a solidified molded article and (4) removing the molded article from the mold.

A further aspect of the invention involves foaming a foamable composition of (a) foamable material chosen from the group consisting of metal, glass, plastic and concrete and (b) foaming agent to provide a multiplicity of bubbles, with the bubbles under less than atmospheric pressure, in a foamed article of manufacture.

Another aspect of the invention involves in an environment of less than atmospheric pressure (1) contacting a first article preformed as a tray of a multiplicity of open-sided compartments with a second article sufficient to enclose the open-sided compartments as individual compartments, the material of construction of each of the first and second articles being an air-tight material, and (2) sealing the first and second articles together creating a sealed article comprising a multiplicity of chambers having a pressure less than atmospheric sealed in an air tight encapsulation.

Another aspect of the invention involves in an environment of less than atmospheric pressure (1) contacting a first article preformed as a tray of a multiplicity of open-sided compartments with a second article sufficient to enclose said open-sided compartments as individual compartments, the material of construction of each of said first and second articles being a material porous to gas flow, (2) sealing said first and second articles together creating a sealed article comprising a multiplicity of chambers having a pressure less than atmospheric and (3) encapsulating said sealed article in an air tight encapsulating material.

Still another aspect of the invention involves in an environment of less than atmospheric pressure (1) preparing a tubular filament of a material of construction that is an air-tight material, and (2) dividing said filament into a multiplicity of sealed elements.

Another aspect of the invention involves in an environment of less than atmospheric pressure contacting (1) the surface of a first preformed, article sufficiently open celled to be porous to the flow of gas with (2) an air-tight, encapsulating material to form thereby a second, air-tight, encapsulated article.

DETAILED DESCRIPTION OF THE INVENTION

According to this invention there is provided a method for preparing an article of manufacture which entails, in an environment under less than atmospheric pressure (1) treating a material to provide a treated material having at least one enclosed chamber therein in which the at least one enclosed chamber is under less than atmospheric pressure and (2) encapsulating the at least one enclosed chamber in a solid, air-tight, encapsulating material of sufficient strength to maintain the integrity and the vacuum characteristic of the at least one enclosed chamber thereby providing an air-tight, encapsulated article having at least one enclosed chamber within which the pressure is less than atmospheric pressure.

Using the procedure set out above can provide an article of manufacture in which there are (1) a multiplicity of chambers enclosed by the material forming the chamber walls in which the material forming the chamber walls is of sufficient strength to maintain the integrity of the structure of the chambers and in which the pressure within at least some of the chambers is less than atmospheric and (2) an air-tight covering enclosing the multiplicity of chambers.

Further according to this invention there is provided a method for treating a molten, encapsulating material in an environment under less than atmospheric pressure to provide a treated, molten, encapsulating material having at least one enclosed chamber therein within which the pressure is less than atmospheric pressure wherein the treated, encapsulating material upon solidifying is (1) air-tight thereby maintaining the vacuum characteristic of the at least one chamber and (2) of sufficient strength to maintain the integrity of the at least one chamber, thereby providing an air-tight article containing at least one chamber within which the pressure is less than atmospheric pressure.

The process described immediately above can provide an article of manufacture having a multiplicity of chambers enclosed in air-tight encapsulation by the material forming the chamber walls in which the material forming the chamber walls is of sufficient strength to maintain the integrity of the structure of said chambers and in which the pressure within at least some of said chambers is less than atmospheric.

Still further, according to this invention there is provided a method for foaming a foamable material and encapsulating the foamed material in a solid material that is air-tight and of sufficient strength to maintain the integrity of the encapsulated foamed material with both the foaming and the encapsulating completed in an environment under less than atmospheric pressure and subsequently transferring the encapsulated foamed material into an environment at atmospheric pressure to provide a material encapsulated in an air-tight covering having at least one enclosed chamber therein within which the pressure is less than atmospheric pressure.

When an article of manufacture is produced by the process just described using a foamable material that at the conclusion of the foaming operation provides air-tight enclosure of the bubbles or vacuum spaces formed in the foaming operation, the product is described as a foamed material in which bubbles or voids formed are enclosed in air-tight encapsulation by the foamed material itself and in which the pressure within the encapsulated bubbles or voids is less than atmospheric.

When an article of manufacture is produced by the process just described using a foamable material that at the conclusion of the foaming operation does not provide air-tight enclosure of the bubbles formed in the foaming operation so that there must be a subsequent encapsulating of the foamed material with another material that provides air-tight encapsulation, the product is described as being composed of (1) a foamed material in which the bubbles formed are enclosed by the material foamed and in which the pressure within the enclosed bubbles is less than atmospheric and (2) an air-tight covering encapsulating the foamed material.

In an environment of less than atmospheric pressure and under sealing conditions a first article preformed as a tray of a multiplicity of open-sided compartments is contacted with a second article sufficient to enclose the open-sided compartments as individual compartments. This second article can be a flat plate or can have partitions dividing it into compartments that mate with the partitions dividing the first article into compartments. The material of construction of each of the first and second articles is an air-tight material that can be caused to unite as by applying heat to at least one of the mating surfaces and pressuring the surfaces together. The fused first and second articles together create a sealed article comprising a multiplicity of chambers having a pressure less than atmospheric sealed in an air tight encapsulation.

In the aspect of the invention in which a first article preformed as a tray of a multiplicity of open-sided compartments is contacted with an article sufficient to enclose said open-sided compartments as individual compartments in which the material of construction of each of the first and second articles is a material porous to gas flow the sealing of the first and second articles to create a sealed article comprising a multiplicity of chambers having a pressure less than atmospheric is carried out as set out above. The outer surface of the sealed article is then encapsulated in an air-tight encapsulating material by spraying, dipping or painting the surface with a coating of material that will become air-tight at normal ambient conditions.

The extruding of tubular filaments is well known in the art. In the present invention a tubular filament of a material of construction that is an air-tight material is prepared in an environment of less than atmospheric pressure and the filament is then divided into a multiplicity of sealed elements in a continuous filament by supplying sufficient (1) heat to soften the tube and (2) pressure to pinch the sides of the tube together to seal the tube to itself.

The sealing can be accomplished at any desired interval and, after sealing, the tube can be severed at any of the sealed portions to produce a filament of desired length. The tube can also first be severed into desired lengths and then sealed at intervals.

In the aspect of the invention involving preparing a tubular filament of a material of construction that is porous-to gas flow, the filament is prepared, sealed and severed or prepared, severed and sealed as set out above to provide a multiplicity of sealed elements and the surface of a sealed article is treated to encapsulate it in an air-tight encapsulating material.

In one of the broader aspects of this invention a first, preformed, open celled article porous to the flow of gas is contacted with an air-tight, encapsulating material in an environment of less than atmospheric pressure to form thereby a second, air-tight, encapsulated article. The article that is porous to the flow of gas can be any article either natural or synthetic that has sufficient integrity to support the encapsulating material.

Essential to this invention is an environment of reduced pressure within which articles of manufacture containing internal open or gaseous spaces can be produced. The means for providing such an environment requires the use of an ample sized production chamber with access through air locks and control of the internal pressure to provide a desired state of vacuum. Means for providing this environment are well known to those of ordinary skill in the art. It is doubted that an amount of vacuum reasonably close enough to a perfect vacuum could be maintained in a facility on the Earth's surface that formation of bubbles in a liquid would be impaired. The pressure at which the production environment is controlled is, therefore, a decision based on the knowledge that the less the pressure in the bubbles formed the greater the insulation value and the practical considerations of maintaining a high state of vacuum in the production facility.

In general, for reasons of practicality, the pressure in the bubbles in the finished product is in a range of about $10^{-12}$ mmHg to about 760 mmHg, preferably in a range of about $10^{-6}$ mmHg to about $10^{-2}$ mmHg, and most preferably in a range of about $10^{-4}$ mmHg to about $10^{-2}$ mmHg.

The invention is based on the knowledge that forming bubbles, voids or vacuum spaces in an environment of reduced pressure will produce areas of space having relatively the same internal pressure as the external environment in which they are produced. Advantage is taken of this fact in different ways: in an environment of reduced pressure (1) a bubble can be blown or bubbles can be formed within an encapsulating material that itself forms an air-tight encasement for the bubbles or (2) bubbles can be formed in a material which is not itself air-tight but which is then encapsulated within an air-tight encasement and subsequent to the air-tight encapsulation either (1) or (2) is removed from the environment of reduced pressure into an environment of atmospheric pressure. Bubbles can also be produced as in (1) or (2) in an environment that is not of pressure below atmospheric and, prior to the setting or hardening of the material, it can be moved into an environment of reduced pressure allowing expansion of the bubbles. Upon hardening, the material encapsulates the bubbles.

When the air-tight, encapsulated articles having bubbles produced at less than atmospheric pressure are transferred into an environment at atmospheric pressure the internal pressure of the bubbles remains at the reduced pressure at which the bubbles were produced and because of the strength of the structure surrounding the bubbles the difference between the external pressure and the pressure within the bubbles does not cause the structure to collapse. Relative to the external atmospheric pressure the articles can be described as having a chamber or chambers therein within which there is a reduced pressure or as having a chamber within which there is less than atmospheric pressure.

The present invention can take advantage of such technology as the use of production stations in space and the use of robotics. A space station can easily provide the environment of reduced pressure required in the present invention. Production chambers in space can more easily be provided with a desired, subatmospheric, operating pressure than can similar work places on the Earth's surface. Programmed robots can operate effectively in an environment of reduced pressure either on a space station or on the Earth. Among the useful products that can be made by the process of this invention are:

(1) monoliths of insulating material that can be sliced or shaped, as by machining, as desired;

(2) sheets of insulating material suitable for incorporation into walls of housing, refrigerators, ovens and other assembly items;

(3) custom molded objects such as thermos bottle liners, insulated cups, items molded to fit specific areas of assembly and the like;

(4) individual spheroids or clusters of spheroids of various relatively small sizes suitable for use as loose fill as in insulation for hollow walls or packing boxes;

(5) self supporting individual or clusters of foamed or bubbled material suitable for mixing into concrete or other building material for original construction or for later application to existing walls;

(6) strings of bubbled material or interlocked bubble beads that can be incorporated into fabric for use in clothing, upholstery and the like;

(7) bubbled or foamed, pliable sheeting or blanketing material;

(8) extruded hollow, cylindrical insulation for pipes and conduits, (9) light weight engineering materials

(10) sealed, hollow, extruded fibers used singly, in bundles, tangled into mats and woven into fabric, and

(11) as set out in (1), (2), (3), (7), (8) and (9) that has another material such as a layer of reflective material laminated on at least one of its surfaces.

Among the materials most useful in the construction of the products of this invention are those that: (1) are liquid- for the purposes of this invention liquid can include a true liquid, a molten material or a liquid slurry; (2) can be manipulated to enclose at least one bubble therein and (3) then can be solidified to encapsulate the at least one bubble in an air-tight enclosure. The useful materials include, among others, metals, metal alloys, polymeric materials (preformed polymers), glass, glass-ceramics, metallic glass, wax, concrete and mixtures thereof. Members of these groups can provide the necessary structural strength, the ability to provide air-tight encapsulation and the ability to be manipulated into the desired products.

Metals, glass and thermoplastics can be melted and molded into desired shapes, and in the molten state can be blown into bubbles or can be treated to disperse bubbles therein. With sufficiently rapid cooling all of these materials can be solidified with structure that will maintain the integrity of the bubbles and provide an air-tight encapsulation of the bubbles. The techniques for producing molded articles useful in this invention are well known in the art and do not constitute a novel feature of this invention.

In one of the preferred modes of this invention any of the materials useful for making foams that do not in the preparation of the foam form air-tight encapsulation of the bubbles formed can be foamed in an environment of pressure less than atmospheric pressure and subsequently the foamed product or any portion thereof can, while still in the environment of pressure less than atmospheric pressure, be encapsulated in an air-tight covering material. Among the foamed materials suitable for this mode of the invention are such flexible plastic foams as polyurethane, rubber latex, polyolefin and vinyl polymers; such rigid plastic foams as polystyrene, polyurethane, polyepoxy and polyvinyl chloride. Techniques for producing foams, either as free forms or in molded shapes, are well known in the art.

Some of the materials cited above can also be formed so that at least a portion of the bubbles formed therein will be encapsulated in an air-tight enclosure of the foamed material as it is foamed. Among such materials are flexible foams of rubber latex, polyolefin, and vinyl polymers; rigid foams of polystyrene, polyepoxy and polyvinyl chloride.

Any material that can be melted, thereafter treated to form at least one bubble therein and solidified retaining the at least one bubble in air-tight encapsulation is useful by a process of this invention. These same materials are useful by a process of this invention to encapsulate foamed material. Among these materials are glass, metals and thermoplastics. Some of the thermoplastics useful in the present invention are polyolefin, nylon, acrylic resin, polystyrene, polysulfone, poly(arylene sulfide), their derivatives and mixtures thereof. Thermosetting materials that can be caused to form bubbles or that can be applied to form air-tight encapsulation of foamed material can also be used in a process of this invention. Among the useful thermosetting materials are phenolics, alkyds, amino resins, crosslinkable polyolefins, polyesters, epoxides, silicones, natural rubber and mixtures thereof.

Although any metal, or combination of metals with other additives in an alloy, that can be used for construction is suitable for the purposes of this invention among those most favored are aluminum, magnesium, and steel, including carbon steel. It should be emphasized that materials suitable for use as construction materials produced by a process of this invention will innately be superior in thermal and acoustic insulation characteristics to products made in the same manner except for having bubbles therein in which the internal pressure is greater.

The process of encapsulating porous material with air-tight material under vacuum conditions is within the ambit of this invention. Glass, ceramics and concrete can be foamed to produce products that are porous. Naturally occurring porous products such as cork and sponge and porous waste products, such as slag foams and clinkers from the burning of coal can be encapsulated under vacuum conditions with an air-tight material to provide products useful, by the process of this invention, as insulating materials.

Similarly, any chambered material that can be created and provided an air-tight seal under vacuum conditions will, when removed to the normal pressure of the Earth, retain the internal vacuum characteristics. Using known technology, flat sheets of stampable material are subjected to stamping pressure to permanently create indentions of any random or ordered shape, as in the form of a tray containing orderly rows of cubic indentations, which is then sealed at the rim of each indentation to a flat sheet or a mirror image stamped tray to provide a multiplicity of vacuum chambers. Using materials for the tray and sealing sheet that are naturally air-tight provides product that will maintain the vacuum characteristics of the chambers. Using materials that are not air-tight for the tray and sealing sheet or tray requires that the outside of the sealed tray be coated by painting, spraying or dipping using an air-tight material to provide a product that will maintain the vacuum characteristics of the chambers.

Similarly, well known methods can be used to produce a hollow filament, crimp it together under sufficient heat and pressure to seal it to itself, cut it into desired lengths and, if desired, provide an encapsulating coating. Carrying out this process under conditions of less than atmospheric pressure provides filaments that will retain the vacuum characteristics of the internal chambers when brought into surroundings of normal pressure. These filaments are then (1) combined into bundles or (2) tangled or woven into fabric to provide an insulating quality to apparel, sheet fabric and the like. The filaments can also be cut into short lengths suitable to be used as filler.

Among the procedures for producing at least one chamber surrounded by an air-tight encapsulating material in which the pressure in the enclosed chamber is less than atmospheric are the following: (1) using a material that will form an air-tight encapsulation, (a) treating a molten material to create bubbles therein as by agitation or aeration and thereafter molding the molten material with bubbles therein and causing the molded material to solidify while the bubbles are still retained, (b) blowing individual bubbles or strings of bubbles of molten material and thereafter causing the encapsulating material to solidify, (c) forming bubbles or groups of bubbles from a mixture of plastic in a carrier material, such as a plastic in an evaporatable carrier liquid, from which a solidified bubble results on removal of the carrier and d) foaming a foamable material and (2) using a material that will not form an air-tight encapsulation, (a) foaming a foamable material and then enclosing the foamed material in an air-tight encapsulating material by a coating method such as spraying, painting, dipping and the like and (b), where there is an economic advantage, forming individual bubbles or groups of bubbles from material that itself will not form an air-tight encapsulation and then enclosing these bubbles in an air-tight encapsulating material by a coating method.

Referring now to the drawing, in FIG. 1 an insulating material 1 is composed of an encapsulating matrix 5 that is air-tight in which is dispersed a multiplicity of chambers 7 having an internal pressure less than atmospheric and to which is laminated a layer 9 of reflective material such as aluminum foil.

Figure 2:
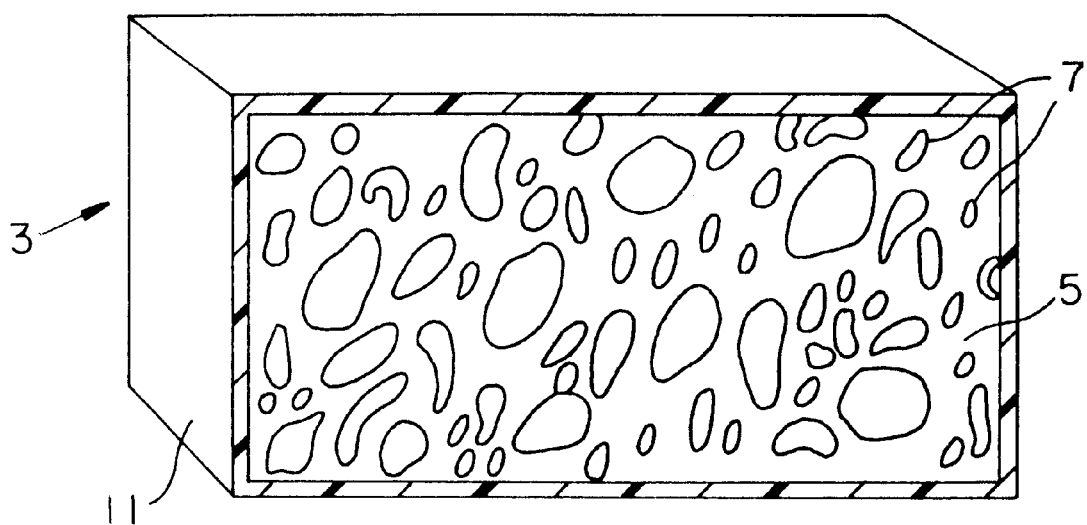
FIG. 2 is a cut sample of insulating material in which bubbles of less than atmospheric pressure are encapsulated in a matrix of material that is not air-tight and the matrix of the insulating material is encapsulated in an air-tight material.

In FIG. 2 an insulating material 1 is composed of an encapsulating matrix 5 that is not air-tight in which is dispersed a multiplicity of chambers 7 having an internal pressure less than atmospheric with the matrix 5 encased in an encapsulating layer of air-tight material.

Figure 3:
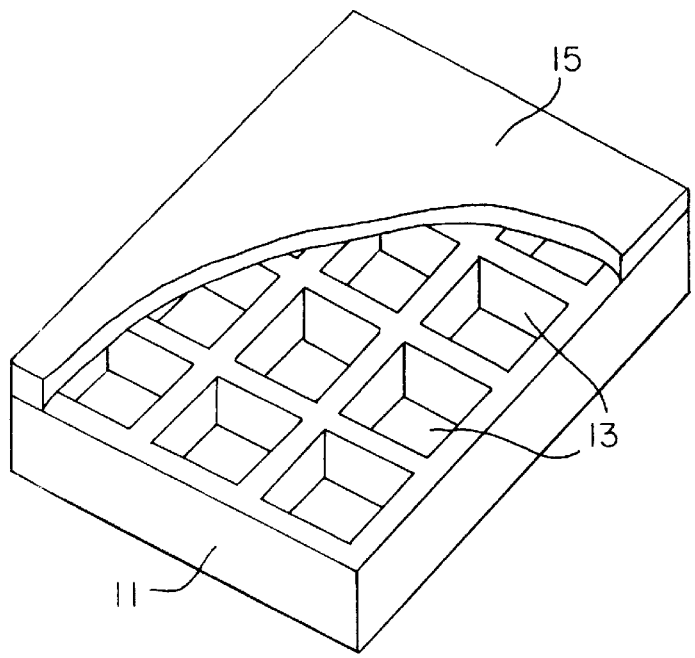
FIG. 3 is a partially cut-away, perspective view of a blank of air-tight material having stamped chambers therein that, under vacuum conditions, has had a sheet of the same air-tight material of construction sealed thereto to provide a multiplicity of chambers surrounded in an air-tight encapsulation.

Referring now to FIG. 3, in an environment of less than atmospheric pressure a preformed blank of air-tight material 11 having stamped chambers 13 therein has a sheet 15 of the same air-tight material sealed to it as by heating the blank by running the open side over a heated roller and then pressing the blank and sheet together until sealed.

Figure 4:
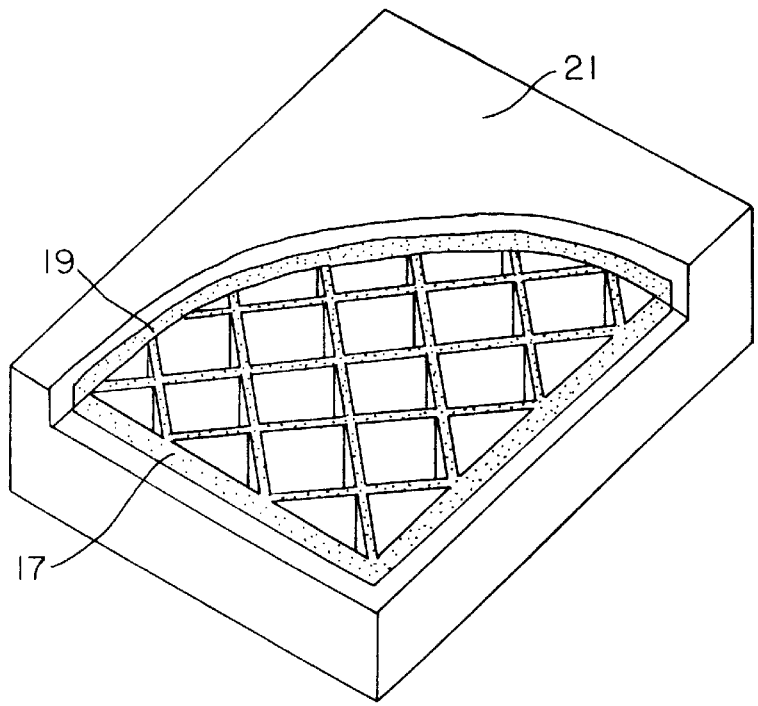
FIG. 4 is a partially cut-away, perspective view of a blank of material having stamped chambers therein that, under vacuum conditions, has had a sheet of the same material of construction sealed thereto and then has been encapsulated with an air-tight material to provide a multiplicity of chambers surrounded in an air-tight encapsulation.

As shown in FIG. 4, in an environment of less than atmospheric pressure a similar preformed blank made of material that is not air-tight 17 has a sheet 19 of the same material sealed to it as set out above. While still in the environment of less than atmospheric pressure the sealed structure of blank and sheet is covered with an encapsulating coating 21 of air-tight material.

Figure 5:
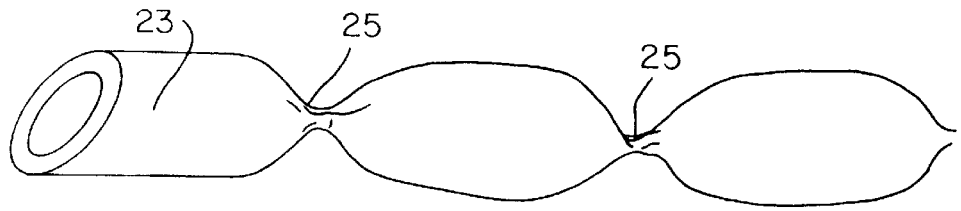
FIG. 5 is a perspective view of a hollow, tubular fiber that has been (1) extruded under vacuum conditions from a material that forms an air-tight skin at room temperature and (2) sealed by crimping evenly on all sides to form at least one air-tight chamber within each fiber.
Figure 6:
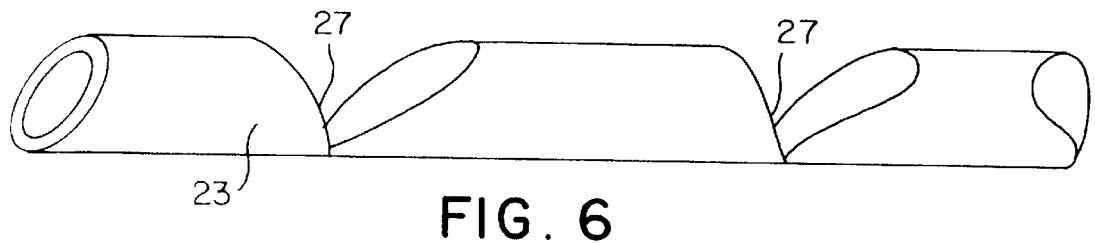
FIG. 6 is a perspective view of a hollow, tubular fiber that has been (1) extruded under vacuum conditions from a material that forms an air-tight skin at room temperature and (2) sealed by pinching to one side to form at least one air-tight chamber within each fiber.

FIGS. 5 and 6 illustrate hollow, tubular filaments 23 that have been extruded from an air-tight material into a vacuum environment, the walls of which have been sealed to themselves by crimping with pressure applied evenly around the filament to provide crimps 25 or by pinching one side of the wall against the other to form pinches 27 by which portions of the filaments are sealed to maintain the vacuum characteristic when the filaments are removed into normal atmospheric pressure.

Figure 7:
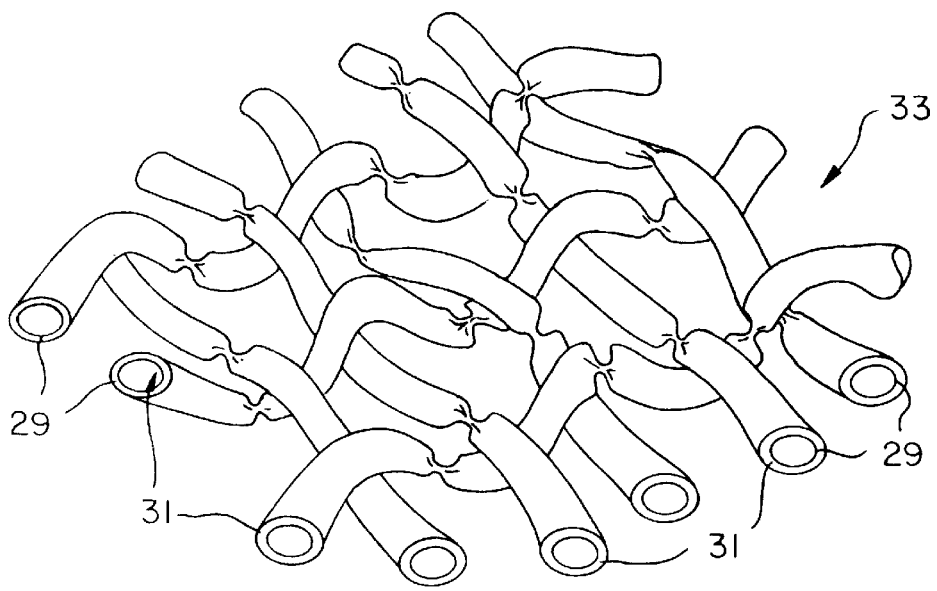
FIG. 7 is a perspective view of hollow, tubular fibers that have been (1) extruded under vacuum conditions, (2) sealed at intervals along the fibers to form chambers within each fiber, (3) encapsulated in an air-tight encapsulating material and woven into a fabric.

FIG. 7 illustrates a filament extruded and pinched as in FIG. 6 above but made of material that is not air-tight 29 which is then provided with an encapsulating coating 31 of air-tight material and individual filaments are woven into a fabric 33.

Alternatively, these filaments can be cut into individual segments or groups of segments and used as filler thereby providing another means for producing vacuum filler material that can be incorporated into construction projects.

The following examples are meant to be illustrative of the current best mode for carrying out a process of the present invention. These examples should not be taken as restricting the scope of the invention.

EXAMPLE I

In a chamber having an internal pressure controlled at $10^{-2}$ mmHg the temperature of 1000 ml of nylon in a beaker is raised to a temperature of 230° C., exceeding the melting temperature of 223° C. The molten nylon is agitated using an agitator blade that introduces gas bubbles from the chamber into the molten material and, while the molten material retains the bubbles, the material is poured into a rectangular bar shaped mold and cooled rapidly to solidify the nylon retaining the bubble structure. The cooled, now solidified nylon bar is removed from the mold. The bubble-containing, nylon bar is removed from the vacuum chamber into ambient conditions as a formed material having contained therein a multiplicity of chambers at less than atmospheric pressure. The formed material is cut in half revealing internal chambers at the cut edges. One of the cut edges is abraded to round the cut end of the bar revealing further evidence of other chambers which are opened by the abrasion. This example shows that a molded bar containing chambers at less than atmospheric pressure can be made of an air tight material which can then be cut or further shaped.

EXAMPLE II

In a chamber having an internal pressure controlled at $10^{-2}$ mmHg the temperature of a 1000 ml steel crucible filled with glass beads is raised to a temperature of 1200° C., exceeding the melting temperature of about 1100° C. The molten glass is aerated by introducing gas from the chamber in the form of small bubbles into the molten material and, while the molten material retains the bubbles, the material is poured into a rectangular bar shaped mold and cooled to solidify the glass retaining the bubble structure. The cooled, now solidified glass bar is removed from the mold. The bubble-containing, glass bar is removed from the vacuum chamber into ambient conditions as a formed material having contained therein a multiplicity of chambers at less than atmospheric pressure. This example shows that a molded bar containing chambers at less than atmospheric pressure can be made of glass.

EXAMPLE III

In a chamber having an internal pressure controlled at $10^{-2}$ mmHg the temperature of a 1000 ml steel crucible filled with aluminum beads is raised to a temperature of 700° C., exceeding the melting temperature of about 660° C. The molten aluminum is aerated by introducing gas from the chamber in the form of small bubbles into the molten material and, while the molten material retains the bubbles, the material is poured into a rectangular bar shaped mold and cooled to solidify the aluminum retaining the bubble structure. The cooled, now solidified glass bar is removed from the mold. The bubble-containing, aluminum bar is removed from the vacuum chamber into ambient conditions as a formed material having contained therein a multiplicity of chambers at less than atmospheric pressure. This example shows that a molded bar containing chambers at less than atmospheric pressure can be made of metal.

EXAMPLE IV

In a chamber having an internal pressure controlled at $10^{-4}$ mmHg polypropylene glycol is treated with diisocyanate in the presence of water and a tin soap catalyst to produce a polyurethane foam. The foam contains a bubbled structure which, because the material is not air tight, has bubbles at the pressure of the chamber. A 10 inch×3 inch×3 inch bar is cut from the foam and encased in a 1/16 inch nylon wrapper which is heat sealed around the bar to form an air-tight enclosure. The sealed bar is removed from the reduced pressure chamber to atmospheric pressure. The bar is then laminated on one side with aluminum foil to produce a bar foamed at reduced pressure, covered with an air-tight sealing layer and laminated on one side with a reflective surface.

EXAMPLE V

A polyurethane foam is produced as in Example IV except the foam is produced at atmospheric pressure. The non-air-tight foam is then moved into a chamber having an internal pressure controlled at $10^{-4}$ mmHg and allowed to come to equilibrium of internal and external pressures. A 10 inch×3 inch×3 inch bar is cut from the foam and encased in a 1/16 inch nylon wrapper which is heat sealed around the bar to form an air-tight enclosure. The sealed bar is removed from the reduced pressure chamber to atmospheric pressure.

EXAMPLE VI

In a chamber having an internal pressure controlled at $10^{-4}$ mmHg, bubbles of molten nylon are blown. As the bubbles are blown the pressure on the inside of the bubble seeks to equilibrate with the outside pressure providing an internal pressure of less than atmospheric. The bubbles of approximately 1 mm diameter can be blown to detach as individual bubbles or can be blown to form a continuous string. In either case the individual bubbles or portions of a continuous string of bubbles are allowed to solidify to provide air-tight encasement of the bubbles and are removed to an environment of atmospheric pressure and used in large amounts as fill-type insulation.

EXAMPLE VII

In a chamber having an internal pressure controlled at $10^{-2}$ mmHg a pre-stamped form of air-porous pressed cardboard having individual cubic chambers stamped therein is coated with adhesive that forms an air-tight seal on the tops of the partitions separating the chambers. A sheet of air-porous cardboard is pressed against the top of the form until the sheet is sealed to the form. The form with sealed covering sheet is then sprayed with molten nylon at 230° C. to form a uniform 1/16 inch coating. The coating is allowed harden. The coated object is removed from the vacuum atmosphere. This example illustrates the preparation of a vacuum characteristic-retaining object from an gas-porous preform.

EXAMPLE VIII

In a chamber having an internal pressure controlled at $10^{-2}$ mmHg a holow, tubular fiber of polyethylene having an external diameter of 1/16 inch is extruded. The extruded tube is passed through a heated, crimping die that presses one side of the tube against the other with a heated knife edge effectively sealing the tube into individual chambers about ½ inch long and flexible at the points of sealing. The fiber is wound onto spools and removed from the vacuum chamber. The fiber is woven into fabric which is used as an interliner for sleeping bags.

EXAMPLE IX

In a chamber having an internal pressure controlled at $10^{-2}$ mmHg the surface of a inch cube of natural sponge is sprayed with molten nylon at 230° C. to form a uniform 1/16 inch coating. The coating is allowed to harden into an air-tight encapsulation. On removal from the vacuum chamber the internal voids of the encapsulated sponge retain their vacuum characteristics.

The invention thus being described, it will be obvious that the same may be varied in many ways. Such variations are not to be regarded as departure from the spirit and scope of the invention and such modifications are intended to be included within the scope of the following claims.

What is claimed is:

1. A method for preparing an article of manufacture said article comprising at least one chamber enclosed by a solid, air-tight, encapsulating material, (A) the pressure inside the at least one chamber having a vacuum characteristic of being less than atmospheric pressure and (B) the encapsulating material of sufficient strength to maintain the integrity and the vacuum characteristic of the at least one chamber the method comprising:

(1) contacting, in an environment of less than atmospheric pressure, (a) the surface of a preformed article that is porous to gases with (b) an encapsulation of a liquid material that solidifies into an air-tight, encapsulating material and (2) in the same environment of less than atmospheric pressure as in step (1), solidifying the liquid material to form thereby an air-tight, encapsulated article.

2. The method of claim 1 wherein the contacting is selected from the group consisting of dipping, spraying and coating the preformed article.

3. The method of claim 2 wherein the liquid material that solidifies into encapsulating material is selected from the group consisting of metals, metal alloys, polymeric materials (preformed polymers), glass, glass-ceramics, metallic glass, wax, concrete and mixtures thereof.

4. The method of claim 1 for preparing an article of manufacture comprising (1) foaming a foamable composition of (a) foamable material and (b) foaming agent to provide a multiplicity of bubbles, wherein the pressure in said bubbles is less than atmospheric pressure, in a foamed article of manufacture and, subsequently, (2) providing said foamed article of manufacture with an air-tight covering employing a liquid material that solidifies into an air-tight encapsulating material.

5. A method of claim 1 wherein the at least one chamber is a multiplicity of bubbles.

6. A method for preparing an article of manufacture said article comprising at least one chamber enclosed by a solid, air-tight, encapsulating material, (A) the pressure inside the at least one chamber having the vacuum characteristic of being less than atmospheric pressure and (B) the encapsulating material being of sufficient strength to maintain the integrity and the vacuum characteristic of said at least one chamber said method comprising:

(1) in an environment of less than atmospheric pressure, foaming a foamable composition of (a) foamable material and (b) foaming agent to provide a preformed, foamed article of manufacture that is porous to gases and contains at least one bubble, wherein the pressure in said at least one bubble is less than atmospheric pressure;

(2) contacting, in the same environment of less than atmospheric pressure as in step (1), the surface of the preformed, foamed article with an encapsulation of a liquid material that solidifies into an air-tight, encapsulating material and (3) solidifying, in the same environment of less than atmospheric pressure as in step (2), the liquid material to form thereby an air-tight, encapsulated article.

7. The method of claim 6 wherein the contacting is selected from the group consisting of dipping, spraying and coating the preformed article.

8. A method of claim 7 wherein the liquid material that solidifies into encapsulating material is selected from the group consisting of metals, metal alloys, polymeric materials (preformed polymers), glass, glass-ceramics, metallic glass, wax, concrete and mixtures thereof.

* * * * *